UNITED STATES PATENT OFFICE.

BENJAMIN PEÑA, OF LAREDO, TEXAS.

COMPOSITION FOR REMOVING BOILER-SCALE.

SPECIFICATION forming part of Letters Patent No. 672,285, dated April 16, 1901.

Application filed August 4, 1900. Serial No. 25,923. (No specimens.)

*To all whom it may concern:*

Be it known that I, BENJAMIN PEÑA, a citizen of the Republic of Mexico, and a resident of Laredo, in the county of Webb and State of Texas, have invented a new and useful Composition for Removing Boiler-Scale, of which the following is a full, clear, and exact description.

The object of my invention is to provide an extract of the plant known to botanists by the name "*Larrea Mexicana*," to be used in removing boiler-scale and in preventing the reformation of the same.

The invention consists in the novel extract referred to and method of preparing the same, as fully described hereinafter.

My process of preparing a solution which will effectually remove boiler-incrustation consists in boiling or steaming the plant *Larrea Mexicana* preferably in sixteen times its weight in water until the weight of the whole has been reduced one-half.

In order to remove scale of one and one-half inches, for example, from a locomotive-boiler, eighty pounds of the solution thus prepared are added to the water in the boiler. After eight days the loosened scale is removed and eighty pounds of the solution are again added to the water in the boiler. Eight days from the second application will generally suffice for the removal of all the scale. In order to prevent reincrustation, twenty-four pounds of the solution are added to the water in the boiler at intervals of approximately fifteen days.

Although I have stated that I boil or steam *Larrea Mexicana* preferably in sixteen times its weight in water for the period mentioned and although I have given the weight of solution and process preferably employed in removing one and one-half inches of scale, I desire it to be understood that other strengths can be made and used, according to the thickness and tenacity of the scale, and that I do not limit myself to the exact proportions mentioned, but reserve to myself the right to make the extract from the said plant *Larrea Mexicana* by boiling or steaming it of other strengths and in other proportions than those above mentioned.

The solution prepared as I have indicated has merits not possessed by most compounds for removing scale. If used as I have directed, the extract will prevent reincrustation and will not corrode or in any way affect the metal which enters into the construction of the boiler.

Having thus clearly described my invention, I claim as new and desire to procure by Letters Patent—

1. A solution for removing boiler-incrustation, consisting of an extract from the plant *Larrea Mexicana*.

2. A compound for removing boiler-incrustation, in which the active ingredient is an extract from the plant *Larrea Mexicana*.

In testimony whereof I have signed my name to this specification in the presence of two subscribing witnesses.

BENJAMIN $\overset{\text{his}}{\times}$ PEÑA.
mark

Witnesses:
HAROLD M. FENNELL,
W. A. BONNET.